US005303163A

United States Patent [19]

Ebaugh et al.

[11] Patent Number: 5,303,163

[45] Date of Patent: Apr. 12, 1994

[54] CONFIGURABLE VEHICLE MONITORING SYSTEM

[75] Inventors: Paul J. Ebaugh; Michael Maass, both of Columbus, Ind.; Gregg Broering, Montgomery, Ala.; Salim A. Jaliwala, Columbus, Ind.

[73] Assignee: Cummins Electronics Company, Columbus, Ind.

[21] Appl. No.: 932,611

[22] Filed: Aug. 20, 1992

[51] Int. Cl.$^{5}$ .............................................. G06F 15/20

[52] U.S. Cl. .................................... 364/550; 340/439; 340/441; 364/424.03; 364/424.04

[58] Field of Search .............................. 340/439, 441; 364/424.03, 424.04, 550

[56] References Cited

U.S. PATENT DOCUMENTS

| | | | |
|---|---|---|---|
| 4,188,618 | 2/1980 | Weisbart | 340/201 |
| 4,236,215 | 11/1980 | Callahan et al. | 364/424.04 |
| 4,258,421 | 3/1981 | Juhasz et al. | 364/424 |
| 4,395,624 | 7/1983 | Wartski | 377/15 |
| 4,539,644 | 9/1985 | Adams et al. | 364/467 |
| 4,685,061 | 8/1987 | Whitaker | 364/424 |
| 4,757,454 | 7/1988 | Hisatake et al. | 364/424 |
| 4,804,937 | 2/1989 | Barbiaux et al. | 340/52 |
| 4,812,994 | 3/1989 | Taylor et al. | 364/464.02 |
| 4,848,133 | 8/1989 | Takeuchi et al. | 364/424.04 |
| 4,853,856 | 8/1989 | Hanway | 364/424.01 |
| 4,853,859 | 8/1989 | Morita et al. | 364/424.04 |
| 4,939,652 | 7/1990 | Steiner | 364/424.04 |
| 4,945,759 | 8/1990 | Krofchalk et al. | 340/439 X |
| 4,998,205 | 3/1991 | Ricard | 364/467 |
| 5,046,007 | 9/1991 | McCrery et al. | 364/424.04 |
| 5,072,397 | 12/1991 | Barns-Slavin et al. | 364/464.02 |
| 5,074,144 | 12/1991 | Krofchalk et al. | 340/439 X |

*Primary Examiner*—Edward R. Cosimano
*Attorney, Agent, or Firm*—Woodard, Emhardt, Naughton, Moriarty & McNett

[57] ABSTRACT

A configurable vehicle monitoring device is disclosed that provides two discrete levels of access to configuration routines. In the first level, the owner/operator can configure the unit at a full access configuration level. At the second configuration level, the driver accesses a limited configuration capability to configure certain non-critical operating features. The configurable vehicle monitoring device gathers data from an engine controller over a standard public domain defined data link. The data is analyzed and vehicle operation data is produced including miles per gallon, fuel consumed, trip time, idle time, fuel consumed during idle versus fuel consumed during driving and other pertinent information relevant to fleet or vehicle operation. An electronic audit trail and data regarding power losses provide an indication of device tampering.

16 Claims, 6 Drawing Sheets

```
--------------------
Veh ID No 123456
No. Access    002        (audit trail)
--------------------
Odom:    054325 Mi
Trip:      1459 Mi
--------------------
Trip:     162.1 gal
29.1 hr    9.2mpg        (hr=hours  gal=gallons)
--------------------
Drive:    155.4 gal
(MPH>0)   9.7 mpg
--------------------
Idle:      12.1 gal
2.3 hr          8%       (hr=hours  gal=gallons)
--------------------
PTO:        4.2 gal      (hr=hours  gal=gallons)
0.6 hr          3%
--------------------
>65 MPH
3.6 hr         12%
--------------------
Datalink      -OK-

--------------------
No pwr   Interrupt

--------------------
->  Diagnostic  <-
Oil Pressure
Volt above Norm
MID 128  FMI 03 A
PID  100 CNT  002
```

Fig. 7

CONFIGURABLE VEHICLE MONITORING SYSTEM

FIELD OF THE INVENTION

The present invention relates generally to data recording devices and more specifically to such a device that is specifically adapted for use in a motor vehicle.

BACKGROUND OF THE INVENTION

Owners of motor vehicles that are used for business purposes are faced with a problem of making the most economical use of their vehicles. In accordance therewith, vehicle recording devices are useful for a variety of applications pertaining to both operator and vehicle communication and control. In regard to the vehicle operator, the vehicle recording device may be used to log and report such items as the operator's driving time, trip time, electronic vehicle controller faults and other operating information. In regard to the vehicle itself, the recording device may be used to record fuel efficiency on a trip-by-trip basis, engine operating parameters and other related information. This information may be subsequently analyzed by a vehicle technician or vehicle owner for maintenance purposes. Additionally, the information may be used in a business delivery environment by the operator's manager to optimize driver efficiency and performance, and to track deliveries made by the vehicle over a given period of time.

Prior art vehicle monitoring systems do not address the ever-changing environment within which the vehicle will be placed in service. For example, interstate/long haul applications vary dramatically versus local and two-lane highway driving. Most fleet owner/managers are interested in establishing performance criteria by which the vehicle operators driving technique can be evaluated and graded. Unfortunately, not every vehicle is operated in the same identical environment. Thus, a vehicle monitoring system which incorporates a configuration capability would enable the operator/manager to establish performance/operating limits so that when these limits are exceeded by the vehicle operator, a warning is issued to the operator that he is in excess of pre-established operating limits. Examples of such operating parameters include maximum vehicle speed and maximum idle time. In addition, certain security mechanisms must be built into a vehicle monitoring device to prevent tampering with the configurable operational characteristics of the device. Such a vehicle monitoring device is needed in order to encourage proper and safe vehicle operation as well as providing feedback to the owner/operator or manager regarding vehicle performance.

SUMMARY OF THE INVENTION

A configurable vehicle monitoring device according to one aspect of the present invention comprises keypad means for producing a plurality of keypad signals corresponding to operator depressions of a plurality of keys forming a part of the keypad means, display means having a display input for displaying alphanumeric information in response to signals supplied to the display input, audible alarm means for producing an audible signal in response to a signal supplied to an input of the alarm means, processor means for receiving, storing, and outputting data, the processor means including memory and a first communication port for communicating with a vehicle control computer to receive vehicle operating information, the processor means (a) receiving vehicle operating condition data via the first communication port, (b) responding to the keypad signals by supplying display signals to the display means in response to certain ones of the keypad signals, the display signals causing vehicle operating conditions to be displayed on the display means, (c) responding to a configuration request represented by a predetermined code sequence of the plurality of keypad signals and entering a configuration programming mode of operation wherein the operator is prompted by messages displayed on the display, in response to signals supplied to the display input by the processor means, to enter driver controlled vehicle operating limits through the keypad which limits are stored in the memory of the processor means, (d) displaying a warning message on the display and supplying an alarm signal to the input of the alarm means in response to detection of vehicle operating conditions monitored by the processor means via data received through the first communication port that are in excess of the driver controlled vehicle operating limits, and (e) processing and storing at least some of the data received via the first communication port for recall and display at a later time.

One object of the present invention is to provide an improved configurable vehicle monitoring device.

Another object of the present invention is to provide a configurable vehicle monitoring device that is configurable to establish predetermined limits with regard to certain vehicle performance criteria or parameters.

Yet another object of the present invention is to provide a configurable vehicle monitoring device that is configurable at two (2) different levels of security to enable the driver to configure certain aspects of the device, and to enable a manager to configure a device at a higher restricted security level.

Still another object of the present invention is to provide a configurable vehicle monitoring device wherein attempts to tamper with the device are noted and recorded to produce an audit trail indicative of tampering attempts.

These and other objects of the present invention will become more apparent from the following description of the preferred embodiment.

BRIEF DESCRIPTIONS OF THE DRAWINGS

FIG. 7 is a sample printout produced by a printer attached to the configurable vehicle monitoring device according to the present invention.

DESCRIPTION OF THE PREFERRED EMBODIMENT

Figure 1:
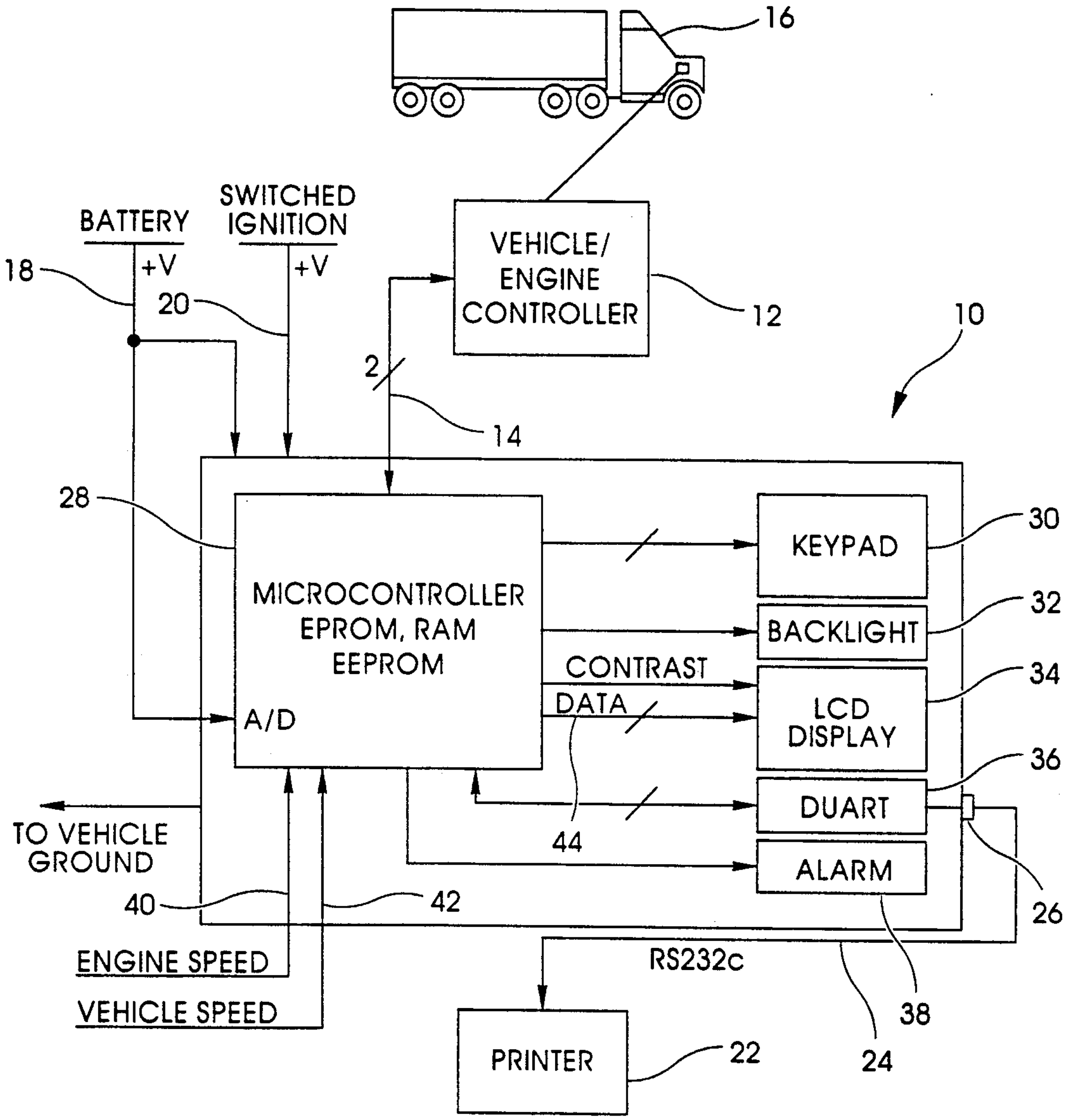
FIG. 1 is a block diagram of a configurable vehicle monitoring device according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram for a configurable vehicle monitoring device 10 according to the present invention is shown. The configurable monitoring device 10 communicates with an engine/vehicle controller 12 via a communications bus 14. The communications bus or data link 14 in the preferred embodiment is an SAE (Society of Automotive Engineers) J1587 bus and operates in accordance with the technical specifications set forth in the SAE J1587 standard. According to the SAE J1587 Bus Industry standard, the Engine Controller 12 is continuously "broadcasting" or transmitting data regarding the operational parameters of the vehicle 16. The SAE J1587 Bus has been designed to be in the public domain. It enables ready access to engine/vehicle data, some of which was previously unavailable or available only at great expense.

Controller 12 (located on vehicle 16) receives input signals from a variety of sensors including oil temperature sensors, engine position sensors, engine speed sensors, vehicle speed sensors, coolant sensors, boost pressure sensors, manifold air temperature sensors, etc. (none of these sensors are shown). Further, controller 12 directly controls a fuel injection system of vehicle 16. Thus, engine/vehicle controller 12 can produce data indicating the activation time periods for the fuel injection system solenoids which correspond directly with the fuel consumption rate of the engine of vehicle 16. Fuel injector Solenoid On/Off times provide a open-loop data reflecting the quantity of fuel metered to the engine of the vehicle 16.

Detailed diagnostic information is provided over the J1587 Bus 14 to facilitate trouble-shooting and repair of the vehicle's engine and/or electronics. The configurable vehicle monitoring device 10 is designed to be mounted either on top of the instrument panel or in the visor area in the cab of the vehicle or truck 16. The device 10 is connected to the SAE J1587 Bus 14, to vehicle power through the unswitched battery signal appearing on signal path 18 and to switched ignition power appearing on signal path 20. A printer 22 is removably connected to device 10 via a serial communications link 24, which link is typically an RS232 format serial data communications link. Device 10 includes a connector 26 to enable convenient connection of the printer 22 to a serial communications interface device contained within device 10. The internal components of device 10 include a microprocessor based microcontroller 28 including EPROM, RAM, I/O and EEPROM, a keypad 30, a backlight 32 for illuminating the LCD display 34, a dual-UART (Universal Asynchronous Receiver Transmitter) or DUART 36 and an audible alarm 38. The majority of data processed by microcontroller 28 is received via the communications link 14. However, an analog to-digital converter or A/D is included in microcontroller 28 and an input thereto is connected to the battery voltage signal path 18 (internally within the device 10) so that the voltage appearing thereon can be monitored. Microcontroller 28 also includes additional input signal handling capabilities in order to receive pulse train signals from engine speed sensors and vehicle speed sensors well-known in the art (not shown) via signal paths 40 and 42, respectively. Signals need not be supplied to signal paths 40 and 42 unless the engine speed and vehicle speed data are unavailable via the communications link 14.

Microcontroller 28 receives operator input signals from keypad 30. Microcontroller 28 controls the backlighting intensity of the backlight 32 to illuminate the LCD display 34. In addition, the contrast adjustment of the LCD display 34 is controlled by microcontroller 28. Data is supplied to the LCD display 34 so that alphanumeric data communication can be conveyed to the operator of the device 10. The LCD display data is supplied over a multi-conductor interface 44 to display 34. Microcontroller 28 is capable of communicating over a serial communications link with two (2) separate devices via the DUART 36, which provides dual full duplex asynchronous serial communications with two external devices. Alarm 38 is an audible alarm triggerable by microcontroller 28 to produce an auditory response in accordance with the software routines executed by the microcontroller 28.

Figure 2:
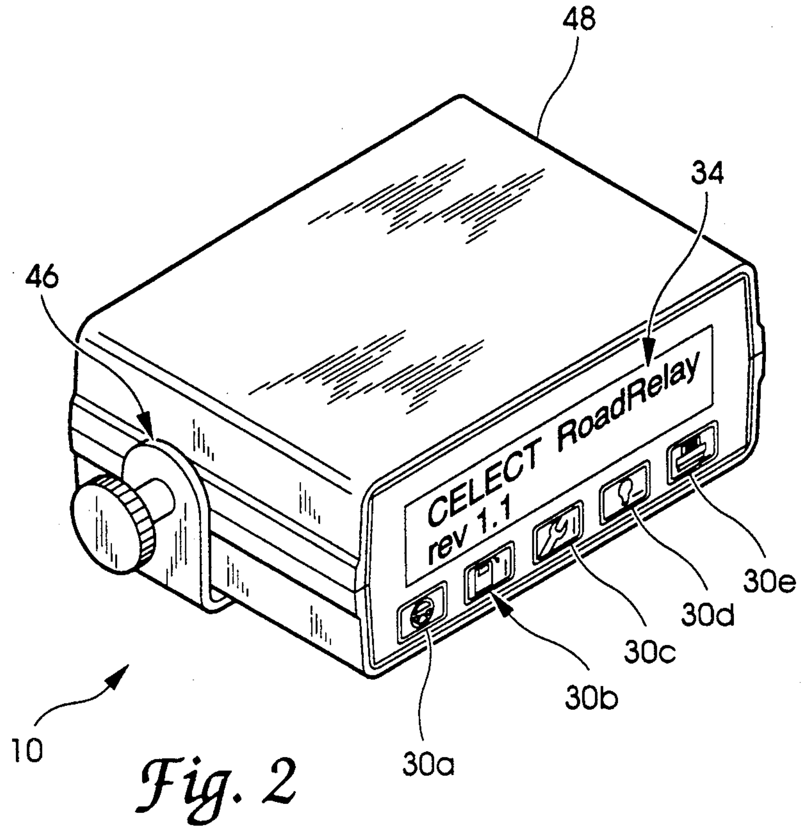
FIG. 2 is a perspective view of one embodiment of the configurable vehicle monitoring device.
Figure 3:
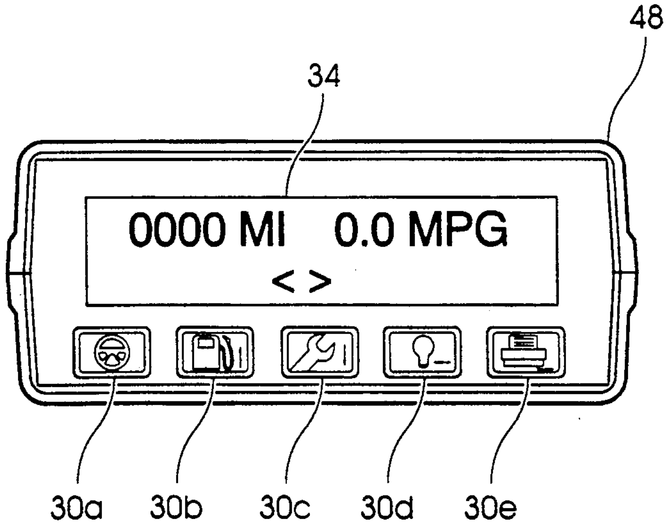
FIG. 3 is a front elevational view of the configurable vehicle monitoring device more fully disclosing the display and control keys of the preferred embodiment.

FIGS. 2 and 3 depict one form of the device 10 that is designed for convenient installation in the cab area of vehicle 16. Bracket 46 can be attached to the visor or the topside of the instrument panel of the vehicle. A sturdy housing 48 contains the microcontroller, keypad, display and other components of the device 10. Display 34 is a 2×16 character display. Keypad 30 includes five (5) individual keys labeled 30*a–e* whose functions will be subsequently discussed. An image of a steering wheel appears on key 30*a*. An image of a gasoline pump appears on key 30*b*. An image of an open-end wrench appears on key 30*c*. An image of light bulb appears on key 30*d*. The outline of a printing device appears on key 30*e*.

The microcontroller 28 used in the preferred embodiment is a Motorola 68HC11F1FN device. This device includes numerous on-chip features including EEPROM, static RAM, digital I/O, timers, an A/D converter and additional control lines for interfacing with other external devices including memory and/or other peripherals such as the keypad 32, display 34 and DUART 36. The DUART used in the preferred embodiment is an EXAR model No. 88C681 Dual Full-Duplex Asynchronus Receiver/Transmitter. The contrast signal supplied to display 34 is a pulse width modulated 50 hertz signal with a duty cycle adjustable from 5% to 90%. Backlight 32 is an LED device. The alarm 38 is a piezo-electric device activated by switching DC power to an input of the alarm 38.

Operationally speaking, the device 10 provides the driver with instantaneous and ongoing performance related data to encourage more efficient vehicle operation. From the perspective of the owner/operator or fleet manager, it can also provide valuable information on vehicle operations thereby providing a tool for improving vehicle efficiency in conjunction with employee drivers. During normal operation, the engine controller 12 continually broadcasts information over datalink 14 regarding the operating conditions or parameters of the vehicle 16. The device 10 is designed to collect, analyze and save vehicle data in memory for later analysis. Information transmitted over the datalink 14 includes injector timing data which corresponds directly with fuel consumption rates, engine speed, vehicle speed which corresponds directly with distance traveled, engine status information, power take-off and other monitored conditions of the engine or vehicle. Device 10 provides the driver with information concerning instantaneous and average miles per gallon, miles into a trip via an electronic trip odometer and any active engine fault codes transmitted by the electronic controller 12 to the device 10. Further, contrast adjustment of the liquid crystal display 34 to compensate for viewing angle and temperature is operator controllable. A hard copy of the operating conditions monitored by device 10 may be produced by activating a particular sequence of keys 30*a–e*.

During a trip, the unit or device 10 collects and saves in memory the following information: total miles traveled, gallons of fuel used, trip miles per gallon, driving miles per gallon, total trip time, drive time, idle time, PTO time, active faults, idle fuel consumption and PTO fuel consumption. In addition, the device 10 can be configured to allow two (2) levels of access to collected data and unit configuration. The owner/operator level and the manager/driver level are the two (2) configuration levels available. The type of access option is selected during initial configuration of the device 10.

Owner/operator access is a first level of configuration access which allows unrestricted access to data and unit 10 configuration. This option is intended solely for the owner/operator. A second level of access is intended for a manager/driver situation. In this option, the driver has limited access to data and configuration while the manager has access to secured set-up steps and information. Through the use of a printer, the manager has full access to data, configuration, and starting and stopping a TRIP as in subsequently discussed.

Figure 4:
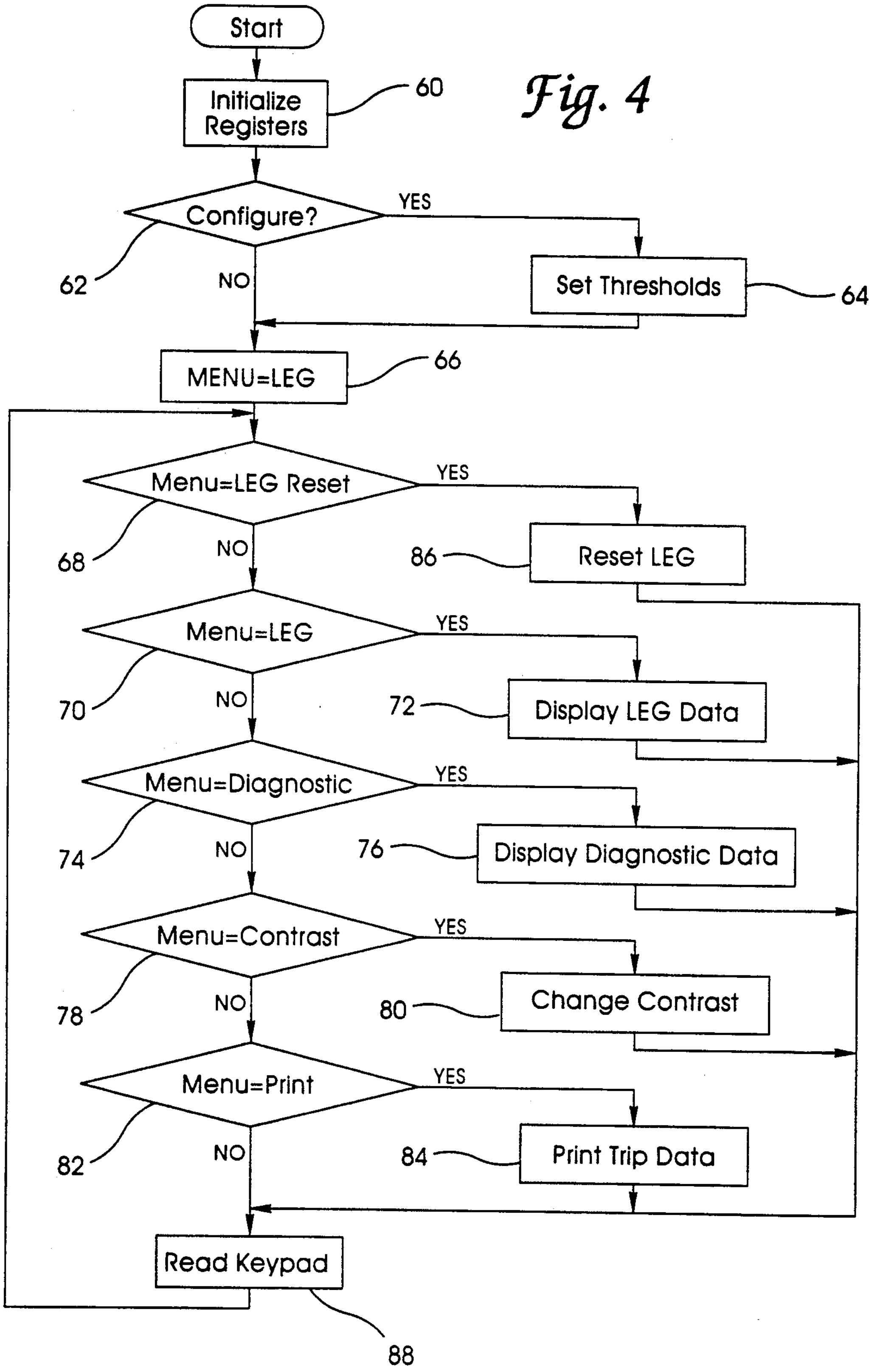
FIG. 4 is a software flow-chart of the main program loop for the configurable vehicle monitoring device according to the present invention.

Referring now to FIG. 4, a flow-chart for the main software routine executed by microcontroller 28 is shown. At step 60, the registers and initialization of the microcontroller and associated hardware takes place. Next, at step 62, microcontroller 28 determines whether the configuration process (more fully described in the flow-chart of FIG. 5) is requested by the operator. The configuration software is invoked or activated if the gas pump key 30*b* is depressed while the driver activates or turns on the ignition switch to the "on" position. After about three (3) seconds of holding the key 30*b* in the depressed position, the configuration utility is activated at step 64, and the programmable thresholds are entered by the device operator. Program execution continues with step 66 following step 64. Thus, step 64 is the device configuration step. Program execution continues with step 66 following step 62 if the answer to the query in step 62 is NO. At step 66, the variable MENU is set equal to a value corresponding to depression of key 30*b* so that data corresponding to a TRIP "LEG" will initially be displayed by the software at step 70. Following step 66, at step 68, the MENU variable is tested to see if it is equal to a "LEG reset" and since the menu variable was set equal to "LEG" in step 66 program execution will continue with step 70. At step 70 the menu variable is tested for equivalency to the leg request variable (LEG) and if true, the "LEG" data is displayed at step 72 on the LCD display. The leg data includes miles per gallon information on the current leg of a trip. Other information also provided at step 72 includes miles traveled (odometer reading), average miles per gallon, and a bar graph indicator as an instantaneous indication of fuel consumption rate. If the MENU variable is not equal to "LEG" at step 70 then program flow continues at step 74 to test whether key 30*c* has been depressed by the operator. If so, then program execution continues at step 76 wherein engine diagnostic or status information (in the form of fault codes received from the engine controller 12) is displayed on the LCD display 34. If the menu variable is not equal to "Diagnostic" in step 74, then program execution continues at step 78 wherein the MENU variable is tested for equivalency to a value indicating the contrast key 30*d* has been depressed indicating the driver's desire to change the contrast of the liquid crystal display 34. If in fact, key 30*d* has been depressed, then program execution continues at step 80 wherein the operator is given an option to increase or decrease the contrast or viewing angle of the display 34. If at step 78 the MENU variable is not equal to a contrast change request, then program execution continues at step 82 wherein the processor 28 tests to see if the MENU variable is equal to the "print" request or a depression of key 30*e*. If such is the case, then program flow continues at step 84 wherein the hard copy printout shown in FIG. 7 is produced by printer 22 if a printer is connected to device 10. If the MENU variable is not equal to the "print" request at step 82 then program execution continues at step 88. If no printer is detected by device 10, then the data shown in FIG. 7 is displayed via display 34. Subsequent depressions of key 30*e* result in vertical scrolling of the information in FIG. 7 on the display 34. Following steps 72, 76, 80 and 84, as well as step 86, the microcontroller 28 reads the keypad at step 88 to determine the next operator entered command entered by depressing keys 30*a–e*. If the key detected at step 88 is a "LEG reset" key corresponding to key 30*a*, then upon resumption of program flow at step 68 (following step 88), the menu variable will be set equal to the keypad value read at step 88 and a "LEG" reset step is next executed (following step 68) at step 86. Following step 86, program flow continues at step 88. At step 86 the "LEG reset" function is similar to resetting a trip odometer. Pressing key 30*a* starts a new leg or ends the current leg of a trip in terms of reporting trip/leg data to the driver.

Figure 5:
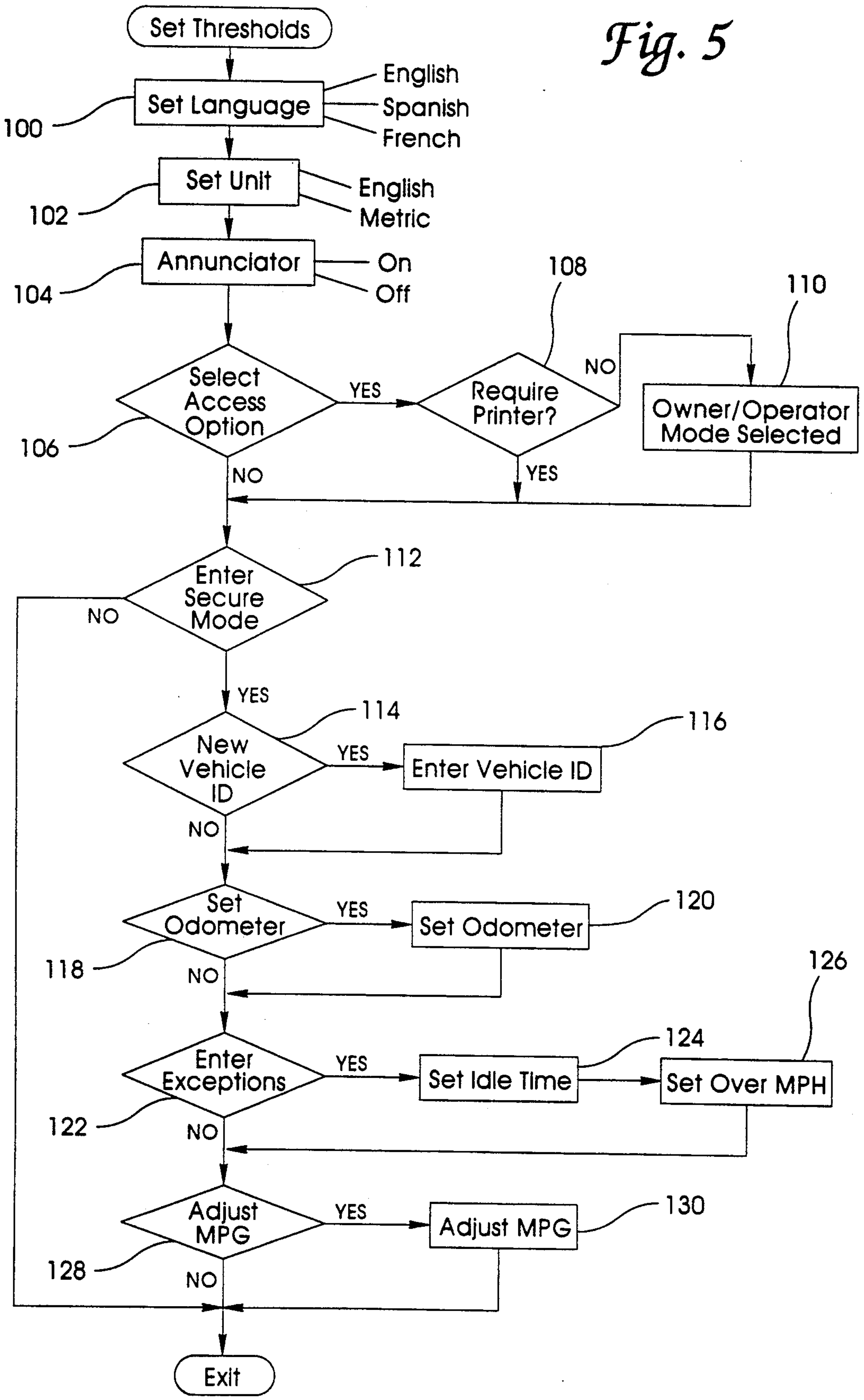
FIG. 5 is a flow-chart of the configuration software routine for the configurable vehicle monitoring device.

Referring now to FIG. 5 a flow-chart for the configuration step 64 of FIG. 4 is shown. At step 100, to change languages the operator need only depress the up or down arrows (key 30*b* includes a dual function up arrow indicator and key 30*c* includes a down arrow indicator in accordance with typical cursor control functionality). In the "set language" step 100 the display will read "language-English". To change the selected language to Spanish or French, the up or down arrow keys 30*b* and 30*c* are depressed. When the desired language is displayed on the LCD display 34, the operator presses the right arrow key 30*e* to select or "enter" the displayed language. Program execution then continues with step 102 wherein the operator is again offered an opportunity to select between English or metric units by pressing the down arrow key. The display 34 reflects the currently selected units. When the desired units are displayed, the operator depresses the right arrow key 30*e* to select the desired units. Next, at step 104 the driver or operator is afforded an opportunity to turn off the audible beeping device or alarm 38 that is activated when a fault is detected during a trip. The unit 10 will still "beep" at each key depression to indicate that a key has been depressed. The operator uses the up arrow or down arrow keys (30*a* and 30*b*) to change between "yes" and "no" for selecting the desired operation of the annunciator or beeper alarm 38. Depressing the right arrow key 30*e* ends step 104 execution.

Processor 28 continues with the configuration routine at step 106 by determining whether the owner/operator level of access is desired. If owner/operator access is selected at step 106 then step 108 is next executed. This level of accessing includes unrestricted access to data and configuration of the device 10. During the set access option at step 106, the information present on display 34 reads "OWNER/OPERATOR LEVEL" and the operator is given an option to enter a "yes" or "no" response to a display prompt of "Require Printer?" depending upon whether complete or limited access to the configuration routine is desired. If full control or owner/operator access level is desired, then at step 108 the operator can select or require that the printer 22 be connected to the unit for configuration, thereby controlling the use of collected data and preventing tampering with unit configuration during data gathering operation in steps 68–88 of FIG. 4. If restricted access (manager/driver level) to the configuration utility is desired, a "yes" answer is entered at step 108 and program execution thereafter continues with step 112. If no printer is required at step 108, i.e. during configuration the owner/operator level of operation is selected, then at step 110 the device 10 records in memory (EEPROM) the fact that owner/operator mode has been programmed or selected. The owner/operator level of access allows full unrestricted access to data and configuration at any time. If the operator inputs a "no" answer to the display prompt of step 106, then program execution continues with step 112 thereafter. Next, at step 112, to continue configuration, the operator selects "yes" by depressing the "right arrow" key 30*e*. If the driver does not wish to continue configuration at step 112, the operator or driver selects the "no" option by depressing key 30*c* and presses the "right arrow" key 30*e* to default and exit the routine of FIG. 5. If "yes" has been entered at step 112, then a new vehicle ID or identification number may be optionally entered at step 114. If the new ID number is desired, then a "yes" command is entered through the keypad cursor keys and the vehicle ID number (a six digit number entered through use of the cursor keys 30*b*–*e*) is entered at step 116. If the operator response at step 114 is the "no" option, then program execution continues at step 118. Thereafter, at step 118, the operator responds to a request for setting the odometer to a predetermined value, and if "yes" is the operator selection, then at step 120 the operator is prompted through displays to enter a new odometer reading through the cursor control keys 30*b*–*e*. Pressing the right arrow cursor key 30*e* indicates the step of entering the odometer reading is completed. Program execution continues at step 122 following step 118 if the operator selects the "no" option at step 118. Next, at step 122, the operator is given an opportunity to program in "exceptions" or conditions that will cause special displays to appear on the LCD display and cause the alarm 38 to be activated. If the operator inputs a "no" response at step 122, then program execution continues at step 128. If a "yes" response is entered through the cursor keys at step 122, then the operator is allowed to enter the number of allowable idle minutes at step 124 and the vehicle speed threshold or overspeed warning level at step 126 through cursor keys 30*b*–*e*. Thus, the operator will be warned if the idle time has been exceeded or the vehicle speed limit has been exceeded by a visual indication on the LCD display 34 and by the activation of audible alarm 38. Next, at step 128, the operator is afforded an opportunity to opt to adjust the miles per gallon calculation if the miles per gallon figure produced by device 10 differs from the measured miles per gallon determined by the vehicle owners fuel records. An adjustment or proportioning value is entered at step 130, if desired, following step 128. Program execution exits the routine flowcharted in FIG. 5 after step 130. If no adjustment is desired at step 128, program execution returns to the calling routine.

Figure 6:
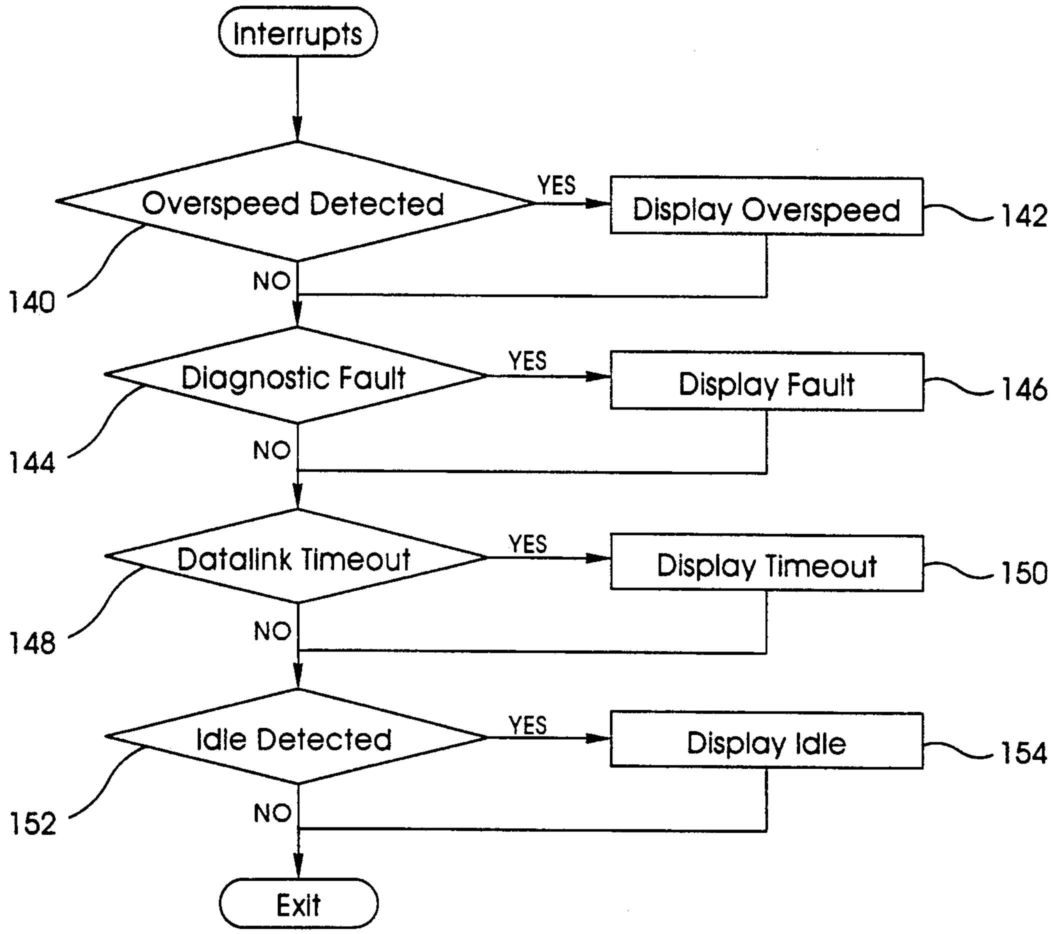
FIG. 6 is a flow-chart of the interrupt software routine of the configurable vehicle monitoring device.

Referring now to FIG. 6, a flow chart for the interrupt software of the device 10 is shown. This interrupt is activated every 0.548 seconds in response to the time-out of a programmable timer. At step 140, if an overspeed has been detected, microcontroller 28 momentarily activates alarm 38 and causes a message to be displayed on display 34 at step 142 indicating that the vehicle is operating at an excessive speed. Program execution continues at step 144 following step 140 if an overspeed condition is not detected. Next, at step 144, microcontroller 28 determines whether or not a diagnostic fault has been received from the engine controller 12 via data link 14, and if so, a corresponding fault message is displayed at step 146 on the display 34. After step 146, step 148 is next executed. If no diagnostic faults have been detected at step 144, then program execution continues at step 148 and the elapsed time between subsequent transmissions of data from the engine controller 12 is timed to determine whether or not a time-out of the data link 14 has occurred. If a time-out has occurred, then program execution continues at step 150 and a message is caused to appear on the display 34 indicating a data link time-out. If no data link time-out is detected at step 148, or following step 150, the engine elapsed idle time is checked to determine if excessive idle time has taken place at step 152. If excessive idle time is detected, then at step 154 the driver is prompted via the display 34 and through the alarm 38, if activated, regarding the excess idle time detected and informed of the quantity of fuel consumed during this idle event. The fuel consumed is measured in 0.01 gallon increments. If the answer to the test of step 152 is no, or after step 154, program execution exits the routine depicted in FIG. 6.

Referring now to FIG. 7, a sample printout of the data supplied by device 10 to printer 22 is shown. The vehicle ID number appears at the top of the list along with the number of accesses to the configuration utility. This provides an audit trail indicating to the fleet manager whether tampering with the configuration utility has taken place. The odometer reading and trip reading follow next. The information regarding gallons used, trip time and miles per gallon appears next. Fuel consumed during driving is listed next under the "drive" category as 155.4 gallons. Further, the miles per gallon for the driving period is also indicated and it should be noted that it is higher than the total miles per gallon rating of 9.2 miles per gallon listed just above in the "Trip" information. The idle information indicates that 12.1 gallons of fuel were used for idle, that idle speed occurred over a total of 2.3 hours and that this was 8 percent of the total trip time. The next category shows the PTO or power take-off usage to have consumed 4.2 gallons of fuel over a 0.6 hour period, which amount represents 3 percent of total operation time. Further, the period of time that the vehicle is operated in excess of the 65 mile per hour overspeed limit was 3.6 hours or a total of 12 percent of the driving time. Further information provided in the printout includes the data link status and whether any power interrupts took place whereby power was interrupted between the battery line and the device 10 (evidencing disconnection of power, perhaps a tampering attempt by the driver). Finally, diagnostic information regarding faults detected by the engine controller and transmitted to the device 10 via data link 14 include oil pressure problems, a voltage above normal and other diagnostic encoded information corresponding to vehicle operating conditions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A configurable vehicle monitoring device comprising:

keypad means for producing a plurality of keypad signals corresponding to operator depressions of a plurality of keys forming a part of said keypad means;

display means having a display input for displaying alphanumeric information in response to signals supplied to said display input;

audible alarm means for producing an audible signal in response to a signal supplied to an input of said alarm means; and processor means for receiving, storing, and outputting data, said processor means including memory and a first communication port for communicating with a vehicle control computer to receive vehicle operating information, said processor means:

(a) receiving vehicle operating condition data via said first communication port;

(b) responding to said keypad signals by supplying display signals to said display means in response to certain ones of said keypad signals, said display signals causing vehicle operating conditions to be displayed on said display means;

(c) responding to a configuration request represented by a predetermined code sequence of said plurality of keypad signals and entering a configuration programming mode of operation wherein the operator is prompted by messages displayed on said display, in response to signals supplied to said display input by said processor means, to enter driver controlled vehicle operating limits through said keypad which limits are stored in said memory of said processor means;

(d) displaying a warning message on said display and supplying an alarm signal to said input of said alarm means in response to detection of vehicle operating conditions monitored by said processor means via data received through said first communication port that are in excess of said driver controlled vehicle operating limits; and (e) processing and storing at least some of the data received via said first communication port for recall and display at a later time.

2. The device of claim 1 wherein said processor means includes a second communications port for connection to a printer to produce a permanent record of said data previously processed and stored by said processor means.

3. The device of claim 2 wherein data received from the vehicle control computer via said first communication port that is processed and stored by said device includes total miles traveled, gallons of fuel used, trip MPG, total trip time, drive time, idle time, PTO time, active vehicle control computer faults, idle fuel consumption and PTO fuel consumption.

4. The device of claim 2 wherein said driver controlled vehicle operating limits include maximum vehicle speed and allowable idle time.

5. The device of claim 4 wherein said processor means, in response to said configuration request, further prompts the operator to enter a vehicle identification number and allows an electronic reset of a tripmeter.

6. The device of claim 5 wherein said processor means enables operator selection of display language via a predetermined sequence of keypad signals produced by operator activation of said keypad means.

7. The device of claim 6 wherein said processor means enables operator selection of english or metric measurement units via a predetermined sequence of keypad signals produced by operator activation of said keypad means.

8. A vehicle monitoring and recording device connectable to a vehicle control computer via a communication link wherein the vehicle control computer periodically transmits vehicle operation data over the communication link, said monitoring and recording device comprising:

keypad means for producing a plurality of keypad signals corresponding to operator depressions of a plurality of keys forming a part of said keypad means;

display means having a display input for displaying alphanumeric information in response to signals supplied to said display input; and processor means operable in:

(1) a first mode of operation to receive said plurality of keypad signals from said keypad means and interpret said signals as control signals, receive vehicle data via the communication link, analyze the vehicle data, supplying display signals to said display input in accordance with operator requests entered via said keypad means and received by said processor means as predetermined ones of said plurality of keypad signals, and storing certain portions of said vehicle data for later recall; and (2) a second mode of operation to enabling configuration of said device in response to a predetermined sequence of keypad signals corresponding to configuration commands recognized by said processor means, said configuration commands programming said processor means to supply an alarm signal to said display input thereby causing said display to visually indicate that certain ones of said vehicle operation data are in excess of limits previously entered via said keypad means in said second mode of operation.

9. The device of claim 8 wherein said processor means is also operable in said second mode of operation to enable limited configuration of said device by the vehicle driver and fully configurable only by the vehicle owner, said limited configuration including selection of a language from a predetermined list of available languages for display messages and selection of English or metric units for displaying vehicle operation data.

10. The device of claim 9 including an alarm means for producing an alarm signal in response to a signal supplied to an input of said alarm means and wherein said processor means operating in said first mode of operation momentarily supplies a signal to said said input of said alarm means when certain ones of said vehicle data are in excess of predetermined limits entered during said second mode of operation.

11. The device of claim 10 wherein said processor means operates in said second mode of operation to enable configuration by the vehicle owner of a vehicle identification number, an initial odometer reading, a vehicle speed threshold and a maximum allowable engine idle time, and wherein said vehicle speed threshold and said maximum allowable engine idle time are said predetermined limits against which the vehicle operation data is compared.

12. The device of claim 10 wherein said certain ones of said vehicle data include vehicle speed and maximum allowable engine idle time.

13. The device of claim 12 wherein said processor means responds to certain keypad signals to produce the following vehicle operation data summary on said display means: total miles traveled, gallons of fuel used, trip miles per gallon, driving miles per gallon, total trip time, total drive time, idle time, power take-off time, active engine faults, idle fuel consumption, and power take-off fuel consumption.

14. The device of claim 13 wherein said device is connected directly to the battery of the vehicle and wherein said processor means includes non-volatile memory, and wherein said processor means monitors said battery signal and stores a battery signal disconnection value in memory corresponding to the number of times said battery signal is disconnected from said device, and wherein said processor means additionally monitors and stores an access count value representing the total number of accesses to said second mode of operation wherein said predetermined limits are established, said processor means displaying said battery signal disconnection value and said access count value in conjunction with the display of the vehicle operation data summary.

15. The device of claim 14 including a printer communication port controlled by said processor means and wherein said processor means supplies signals to said printer communication port corresponding to said vehicle operation data summary.

16. The device of claim 15 wherein said processor means will not operate in said second mode of operation to enable configuration of said predetermined limits unless said processor means detects that a printer is connected to said printer communication port.

* * * * *